United States Patent Office 3,405,484
Patented Oct. 15, 1968

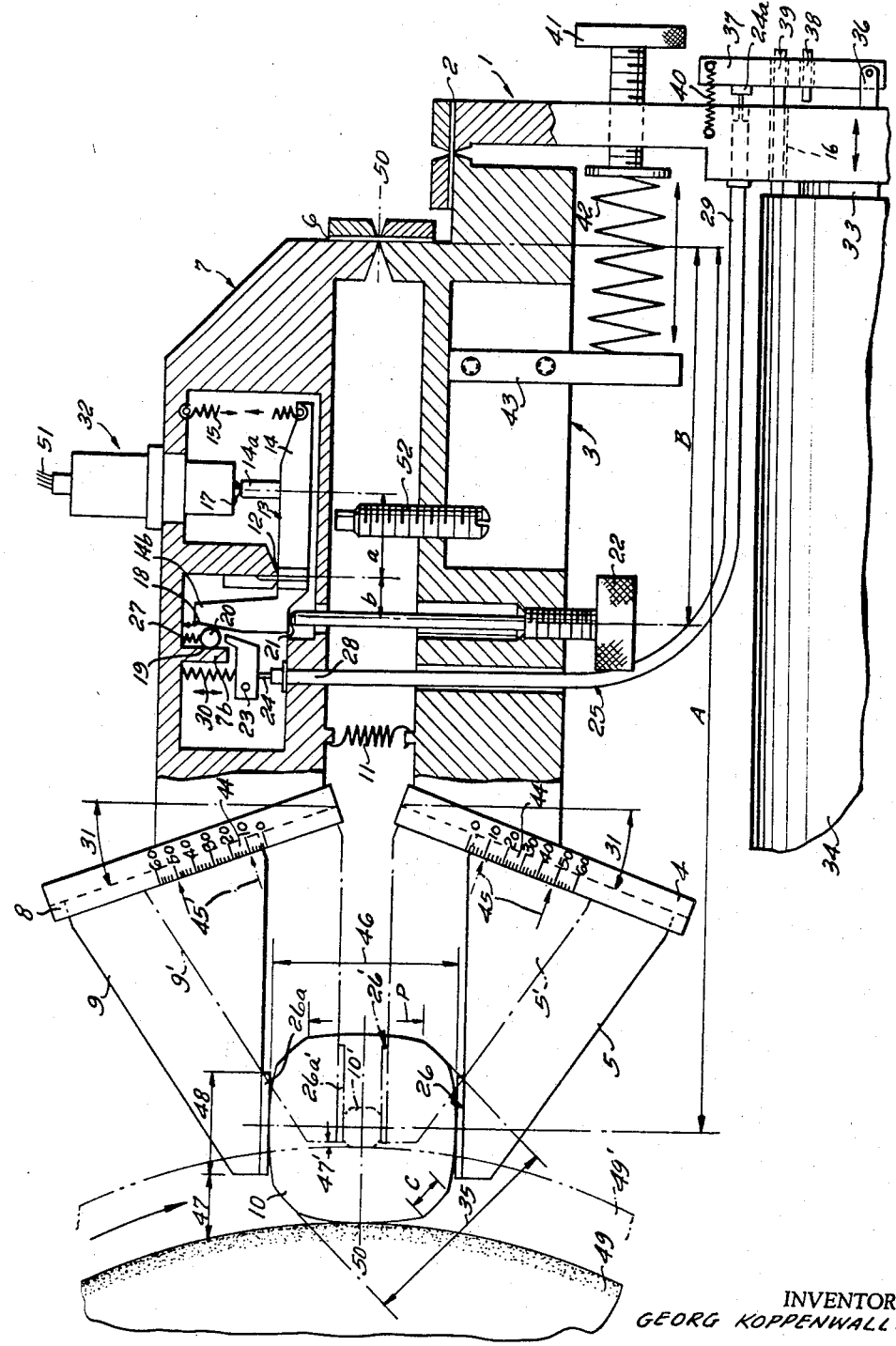

3,405,484
CONTROL APPARATUS FOR GRINDING
MACHINES AND THE LIKE
Georg Koppenwallner, Stuttgart-Botnang, Germany, assignor to Fortuna-Werke Spezialmaschinenfabrik AG., Stuttgart-Bad Cannstatt, Germany
Filed Mar. 10, 1966, Ser. No. 533,323
Claims priority, application Germany, Mar. 11, 1965, F 45,480
16 Claims. (Cl. 51—165)

ABSTRACT OF THE DISCLOSURE

The operation of a machine wherein a tool rotating about an axis which travels along an elliptical path removes material from a revolving workpiece whose surface to be treated has a minimum and a maximum diameter is controlled by an apparatus which comprises a measuring unit serving to determine the extent to which the tool removes material from the surface of the workpiece and a signal generating unit which transmits signals to the machine to terminate the removal of material when the dimensions of the workpiece approximate or equal the dimensions of a pattern.

---

The present invention relates to an apparatus for controlling the operation of machines wherein one or more tools remove material from non-circular surfaces of revolving workpieces. For example, the apparatus of my invention may be utilized to control the operation of a grinding or like machine wherein a rotary wheel removes material from the polygonal surface of a revolving workpiece and wherein the surface is urged into interrupted or uninterrupted contact with the active surface of the wheel so that it is compelled to reciprocate back and forth.

In precision treatment of symmetric polygonal surfaces on revolving workpieces, measurements which are carried out to determine the extent to which the tool has removed material from such surfaces must be performed by rather complicated devices because, in tracking the non-circular outline or profile of the revolving workpiece, the tracers or followers of the measuring unit must move toward and away from each other and also because the zones (lines, points or surfaces) of contact between the work-contacting faces of the tracers and the surface of the workpiece move back and forth in response to variations in radii of curvature of the surface of the workpiece. For example, if the active surface of a grinding wheel which rotates about an elliptically moved axis removes material from a revolving surface having a maximum diameter and a minimum diameter, the zones of contact between the tracers and the workpiece will by necessity travel back and forth as long as the rotating workpiece remains in contact with the grinding wheel. Such revolving surface may have a so-called P3, PC3, P4 or PC4 profile wherein the character P indicates a facet whose center of curvature is not located on the axis of the workpiece and the character C indicates a facet whose center of curvature is on the axis of the workpiece. The numeral indicates the total number of the facets C and/or P. Thus, a PC4 profile will be composed of eight facets whereby the facets P alternate with the facets C. Such profile resembles a rectangle with rounded corners. Since it is one of the more complicated among those profiles which are to be treated by resorting to the control apparatus of my invention, the following part of this description will deal mainly with treatment of a PC4 profile with the understanding, however, that such profile is but one of many non-circular profiles which can be treated in accordance with my invention.

In controlling the operation of machines which remove material from cylindrical or similar surfaces of circular profile or outline, the revolving surface is tracked by two followers or tracers which are maintained in contact with two diametrically opposed portions of the revolving surface. When the distance between the two tracers decreases to a preselected minimum value which is indicative that no further removal of material should take place, the tracers cause a suitable signal generating unit to arrest the tool and/or the workpiece.

The situation is more complicated when a pair of similar tracers is utilized to determine the extent of material removal from a surface with a PC4 profile because the tracers must move toward and away from each other and also because the zones of contact move back and forth along the work-engaging faces of the tracers. Thus, such faces must be reasonably large, especially if the same set of tracers is to be utilized in connection with differently dimensioned workpieces. On the other hand, the faces of the tracers should not be too large so that they will not interfere with removal of material from small workpieces. When a surface having a PC4 profile rotates and remains in interrupted contact with a grinding wheel, the zone of contact between the face of a tracer and the workpiece travels as follows: Beginning at the center of a facet P, the zone of contact travels from the center of the face of the tracer in one direction, counter to the direction of rotation of the workpiece, then back to the center of the face, thereupon in the opposite direction and back to the center of the face. Such center of the face is then in contact with the center of the next facet P. Consequently, the face on the tracer must be rather long, i.e., much longer than a face which tracks a surface of circular outline wherein the zone of contact remains at a standstill. Especially in treatment of surfaces with a P3 profile, the faces of the tracers must be long enough to invariably remain in contact with the revolving surface because, otherwise, the control apparatus would arrest the machine before the removal of material is completed. The same holds true for surfaces with a PC3 or PC4 profile even though the danger of premature stoppage is less pronounced. However, it is equally important to prevent a sharp edge of a tracer from coming in actual contact with the revolving surface because the material of the tracers is very hard and their edges would be likely to leave in the precision-finished surface scratch marks and similar undesirable deformations.

Accordingly, it is an important object of the present invention to provide a novel and improved apparatus which can control the operation of machines serving to remove material from non-circular surfaces of revolving work-pieces, and to equip the improved apparatus with a measuring unit capable of determining the degree of material removal from a large variety of differently configurated and/or dimensioned workpieces.

Another object of the invention is to provide a control apparatus of the just outlined characteristics wherein the non-circular surface of the revolving workpiece is tracked by a pair of relatively movable tracers or followers and to dimension the work-engaging faces of such tracers with a view to avoid interference with removal of material from relatively large or relatively small workpieces as well as to prevent scratching of the non-circular surface.

A further object of the invention is to provide a novel operative connection between the measuring unit which includes such tracers and the signal generating unit of my apparatus which latter serves to produce impulses which actually control the operation of the material removing machine.

An additional object of the invention is to provide a measuring unit which includes the aforementioned tracers and to construct the measuring unit in such a way that the tracers may be readily adjusted and/or exchanged with little loss in time.

A concomitant object of the invention is to provide a measuring unit of the just outlined characteristics wherein all sensitive and precision-finished parts are protected against excessive stresses and/or excessive wear when the measuring unit is manipulated to move it into or from engagement with a workpiece.

Briefly stated, my present invention resides in the provision of an apparatus for controlling the operation of a machine wherein a tool (for example, a grinding wheel which rotates about an elliptically moved axis) removes material from a revolving workpiece whose surface to be treated has a minimum and a maximum diameter so that, while such surface remains in contact with the tool, the revolving grinding wheel moves on an ellipse in a predetermined direction (i.e., if the invention is embodied in a grinding machine). The improved apparatus comprises a measuring unit which determines or measures the extent to which the tool removes material from the surface of the workpiece, and a signal generating unit which can transmit signals to the machine, preferably to terminate removal of material when the dimensions of the workpiece approximate or equal the dimensions of a model or pattern.

In accordance with an important feature of the invention, the measuring unit comprises a pair of relatively movable carriers or legs and a tracer carried by each of the legs. The tracers have faces which engage the surface of the workpiece in zones located diametrically opposite each other so that the tracers move toward and away from each other when the workpiece rotates whereby the zones of contact between the faces of the tracers and the surface to be treated travel back and forth in the direction in which the faces of the tracers extend. The length of the faces on the tracers, as seen in the direction of the travel of said zones, at least approximates the length of one side of a right-angled triangle whose hypotenuse at least approximates the maximum diameter and whose third side at least approximates the minimum diameter of the non-circular surface of largest workpiece which is to be treated in the machine.

In accordance with another feature of the invention, the carriers are provided with mutually inclined ways and the tracers are mounted on or are integral with suitable holders or jaws which are adjustable in the respective ways.

The novel features which are considered as characteristic of the invention are set forth in particular in the appended claims. The improved control apparatus itself, however, both as to its construction and its mode of operation, together with additional features and advantages thereof, will be best understood upon perusal of the following detailed description of a specific embodiment with reference to the accompanying drawing the single illustration of which is a somewhat diagrammatic partly elevational and partly vertical sectional view of a control apparatus which embodies my invention and whose measuring unit is shown in the process of measuring the dimensions of a workpiece of regular polygonal outline.

Referring to the drawing in detail, the improved control apparatus comprises a measuring unit in the form of an outside caliper and a signal generating unit which produces impulses serving to arrest and/or to otherwise control (the speed and/or other functions of) a grinding, lapping, honing, polishing or analogous material removing machine. In the illustrated embodiment, the machine is a grinding machine and includes a grinding wheel 49 which is driven by a suitable motor (not shown) to rotate about a horizontal axis. This grinding wheel 49 is utilized to grind the external surface of a polygonal workpiece 10, such external surface including four larger facets P alternating with four smaller facets C. The wheel 49 is rotated in a clockwise direction and the workpiece 10 is rotated in a clockwise or in a counterclockwise direction and, in order to maintain its surface to be ground in contact with the active surface of the grinding wheel 49, must travel back and forth toward and away from the axis of the grinding wheel. The workpiece 10 has a so-called PC4 profile wherein the numeral "4" denotes the number of facets P or C. The centers of curvature of the facets C are located on the axis of the workpiece 10 and the radii of curvature of the facets C are smaller than those of the facets P.

The apparatus comprises a main support or base 1 which is attached to the piston rod 33 of a double-acting pneumatic or hydraulic displacing cylinder 34 capable of reciprocating the base 1 toward and away from the workpiece 10. The measuring unit or caliper comprises two carriers or legs 3 and 7 the former of which is attached to the upper end of the base 1 by a flexible elastic hinge 2 which enables it to turn about a horizontal axis parallel to the axis of the workpiece 10. The leg 7 is located at a level above the leg 3 and is pivotably attached thereto by a second flexible elastic hinge 6 so that it can pivot about a second horizontal axis parallel to the axis of the workpiece. The phantom line 50—50 indicates a horizontal plane which includes the pivot axis of the upper leg 7 (hinge 6), the axis of the workpiece 10, and the axis of the grinding wheel 49.

The free or front ends of the legs 3 and 7 are respectively provided with mutually inclined ways 4 and 8 for two adjustable holders or jaws 5 and 9 which respectively carry plate-like tracers or followers 26, 26a. The work-contacting faces of the tracers 26, 26a have the same area and these tracers consist of very hard and precision-finished material to guarantee long use and very accurate measurements. The caliper which includes the legs 3 and 7 is intended to measure relatively small workpieces and, therefore, the inclination of ways 4 and 8 (see the angles 31) with reference to the longitudinal direction of the legs 3 and 7 is about 20 degrees. For example, the maximum diameter of a workpiece to be measured by a caliper wherein the ways 4 and 8 are inclined through angles 31 of 20 degrees may be in the range of 50 mm. It will be seen that the ways 4 and 8 make an obtuse angle with each other and that they, as well as the tracers 26, 26a, are mirror symmetrical with reference to the plane 50—50.

A spring 11 couples the legs 3 and 7 and biases the tracers 26, 26a toward each other. An adjustable stop screw 52 meshes with the lower leg 3 and is held in such axial position that its tip abuts against the upper leg 7 when the tracers 26, 26a are disengaged from the workpiece 10 and are compelled by the spring 11 to move to positions at a predetermined minimum distance from each other.

The electronic signal generating unit 32 is controlled by the measuring unit and the operative connection between these units comprises a two-armed actuating lever 13 which is fulcrumed on a flexible elastic band 12 mounted in the upper leg 7 so that it can pivot about a horizontal axis parallel to the axis of the workpiece 10. The right-hand arm 14 of the actuating lever 13 is biased by a contraction spring 15 which tends to rock the lever in a counterclockwise direction, as viewed in the drawing, and to a starting position. The arm 14 carries a trip 14a which is biased against a contact 17 forming part of the signal generating unit 32, the latter being connected in circuit with the motor means of the grinding machine by a cable 51. In the illustrated embodiment, the unit 32 will send a signal which arrests the grinding machine when the trip 14a is moved to a maximum distance from the contact 17, i.e., when the actuating lever 13 has left its starting position and assumes a predetermined or preselected position.

The left-hand arm 14b of the lever 13 is provided with an inclined blocking surface 18 which is adjacent to but spaced from a blocking surface 19 provided on an internal rib or projection 7b of the upper leg 7. The surfaces 18 and 19 define between themselves a substantially wedge-shaped space which tapers downwardly, as viewed in the drawing, and accommodates a blocking element here shown as a small sphere 20 which penetrates deeper into such space in response to clockwise angular displacement of the lever 13 and normally prevents rotation or pivoting of this lever in the opposite direction, i.e., back to starting position. The sphere 20 is preferably biased by a relatively weak spring 27 which tends to force it into the narrower bottom zone of the space between the surfaces 18 and 19. The mutual inclination of these surfaces is such that the sphere 20 is self-locking by gravity, i.e., the spring 27 constitutes an optional feature of the blocking means. Also, the sphere 20 may be replaced by a roller, pin or other suitable blocking element.

An adjustable rocking screw 21 is mounted in the lower leg 3 and its tip extends through an opening in the underside of the upper leg 7 so that it may abut against a shoulder at the underside of the arm 14b to limit the extent to which the lever 13 can turn in a counterclockwise direction when the sphere 20 is lifted. Thus, the screw 21 determines the aforementioned initial or starting position of the lever 13, and this screw is provided with a milled head 22 which is accessible to the operator. As the active surface of the grinding wheel 49 proceeds to remove material from the polygonal surface of the workpiece 10, the tracers 26, 26a move nearer to each other and the screw 21 rocks the lever 13 in a clockwise direction to move the trip 14a further away from the signal generator 32. During each revolution of the workpiece 10, the tip of the screw 21 moves four times into and out of engagement with the arm 14b because the surface of the workpiece comprises four smaller facets whose curvature is the same and whose center of curvature is located on the axis of the workpiece, and four larger facets whose centers of curvature are not on the axis of the workpiece. Thus, the number of engagements between the screw 21 and the lever 13 during each revolution of the workpiece 10 equals the number of such facets whose centers of curvature are not located on the axis of the workpiece. The larger facets will be only convex. The other end position of the lever 13, just before the signal generating unit 32 sends an impulse which arrests the grinding machine, is determined by the position of the sphere 20 in the idle position of the apparatus.

The sphere 20 may be lifted to permit counterclockwise movement of the lever 13 back to starting position. Such lifting can be effected by an unblocking or releasing device which includes a releasing or motion transmitting lever 23 mounted in an internal chamber of the upper leg 7 and having a pallet which can be moved against the sphere 20 from below to lift it against the bias of the spring 27. The lever 23 is rockable on a horizontal pivot pin and is biased by a helical spring 30 which tends to move its pallet downwardly and away from the sphere 20 whereby the lever 23 abuts against the flexible inner shaft or core 24 of a Bowden wire. The inner shaft 24 can displace the lever 23 in a counterclockwise direction to move the sphere 20 upwardly. The outer shaft or sheath 25 of the Bowden wire has an upper end portion 28 which is anchored in the leg 7 just below the lever 23 and a second end portion 29 which is attached to the base 1.

As stated before, the base 1 is reciprocable by the displacing cylinder 34 through strokes of such length that the tracers 26, 26a may be disengaged from the workpiece 10. This base carries a bearing bracket 36 for a lever 37 which is biased by a spring 40 tending to turn it in a counterclockwise direction whereby the tip of an adjustable stop pin 39 abuts against the cylinder 34, provided that the tracers 26, 26a engage the workpiece 10. This pin 39 meshes with the lever 37 and extends through a bore 16 machined into the base 1. When the base is moved away from the cylinder 34 so that the tracers 26, 26a are disengaged from the workpiece 10, the spring 40 is free to turn the lever 37 and moves the tip of a second adjustable stop pin 38 against the adjacent side face of the base 1. Such slight counterclockwise angular displacement of the lever 37 suffices to shift the head 24a of the inner shaft 24 so that the upper end of the shaft 24 rocks the releasing lever 23 and causes the latter to lift the sphere 20 against the opposition of the spring 27 whereby the spring 15 immediately returns the actuating lever 13 to its starting position by rocking the lever 13 in a counterclockwise direction to the extent determined by the rocking screw 21.

When the stop pin 39 abuts against the displacing cylinder 34, the bias of the spring 40 upon the head 24a of the inner shaft 24 is ineffective so that the projecting upper end of this shaft is pushed back toward the upper end portion 28 of the sheath 25 because the spring 30 biases the releasing lever 23 in a counterclockwise direction. The width of the gap between the base 1 and the tip of the stop screw 38 determines the extent of axial displacement of the inner shaft 24 and the initial level of the sphere 20 when the cylinder 34 thereupon shifts the base 1 to the right so that the stop pin 39 becomes ineffective.

A further adjusting screw 41, carried by the base 1, serves to regulate the bias of a strong helical expansion spring 42 which bears against a plate 43 carried by the lower leg 3 and tends to turn this lower leg in a clockwise direction. The purpose of the spring 42 is to place the tracers 26, 26a into a position of mirror symmetry with reference to the plane 50—50. The stop screw 52 maintains the tracers 26, 26a at such a minimum distance from each other that the wear on the faces of these tracers is relatively low when the apparatus is moved from a retracted or idle position to the operative position which is shown in the drawing. The screw 52 also protects the hinge 2 from excessive flexing.

The scales 44 of the ways 4, 8 and the indexes or markers 45 on the jaws 5, 9 assist the operator in effecting coarse adjustments in the position of the tracers 26, 26a to make sure that the faces of these tracers remain in continuous contact with the workpiece 10 even when the latter rotates and is thereby compelled to travel toward and away from the axis of the grinding wheel 49.

The length 48 of the work-engaging faces on the tracers 26, 26a (as seen in the direction radially of the axis of the grinding wheel 49) at least approximates the length of the shortest side of a right-angled triangle whose hypotenuse equals or approximates the maximum diameter 35 and whose third side equals or approximates the minimum diameter 46 of the largest workpiece which is to be treated by using a given pair of tracers. Such dimensioning of the faces on the tracers 26, 26a insures that the tracers cannot come in actual contact with the active surface of the grinding wheel 49. The clearance between the leftmost edges of the tracers 26, 26a and the grinding wheel 49 is indicated at 47. The length 48 is actually somewhat excessive; however, if selected in the above outlined way, such length is invariably sufficient to guarantee uninterrupted contact between the tracers and the workpiece having a surface of non-circular profile.

The phantom lines 26', 26a' and 5', 9' respectively indicate the positions of tracers 26, 26a and jaws 5, 9 when the tracers engage the surface of a small workpiece 10' which is treated by the active surface of a grinding wheel 49'. The clearance 47 is then reduced as shown at 47'.

The provision of inclined ways 4, 8 for the jaws 5, 9 of the tracers 26, 26a is desirable and advantageous for the following reasons: In tracking a revolving surface of circular profile, the tracers are simply adjusted toward and away from each other by moving them in directions at right angles to their faces in order that the space between such faces may accommodate a workpiece of smaller or larger diameter. Were the tracers 26, 26a of my measuring unit adjusted in the same way, i.e., in directions at right angles to their work-engaging faces, it could happen that the active surface of the grinding wheel would be prevented from reaching the surface of a small workpiece. This will be readily understood by referring to the drawing and by assuming that, in order to engage the smaller workpiece 10', the tracers 26, 26a would be moved vertically toward each other (rather than by causing the jaws 5 and 9 to slide in the inclined ways 4 and 8). Clearly, the active surface of the grinding wheel 49' would be unable to reach the surface of the workpiece 10'. On the other hand, if the faces of the tracers 26, 26a were to be dimensioned so as to be just large enough for tracking of the small workpiece 10', they could not remain in uninterrupted contact with the surface of the larger workpiece 10. Of course, the control apparatus could be furnished with a different set of tracers for each size of workpieces. However, an interchange of tracers involves a certain amount of time and, furthermore, the purchase of many spare sets of tracers would contribute considerably to the initial cost of the apparatus. The provision of inclined ways 4 and 8 enables the operator to rapidly adjust a single set of tracers 26, 26a in such a way that such tracers can be used in connection with a full series of differently dimensioned workpieces whereby the maximum diameter (or even the minimum diameter) of a large workpiece may be a multiple of the maximum diameter of the smallest workpiece which can be measured by resorting to the same set of tracers. The aforementioned selection of the length 48 of the faces on the tracers 26, 26a was made by full consideration of the fact that, in removal of material from surfaces with a PC3 or PC4 profile, the minimum diameter of the finished surface is not determined while the faces of the tracers simply move toward each other in response to removal of material from the workpiece. In treatment of surfaces with such profiles, the tracers must move toward and away from each other and repeatedly reverse the direction of their movement during each revolution of the workpiece. The minimum diameter can be readily determined when the workpiece is idle (for example, by utilizing conventional micrometer gauges, calipers or like instruments), but the measurement is much more complicated when the workpiece revolves at a high speed and when the measurement is to be utilized for effecting the generation of a signal at the exact moment when the minimum diameter of the workpiece equals an accurately determined value.

The inclination of the ways 4 and 8 (angles 31) is selected with a view to insure that a gap 47 or 47' remains between the tracers 26, 26a and the active surface regardless of the size of a workpiece, as long as the dimensions of the workpiece do not exceed the dimensions of that workpiece whose minimum and maximum diameters were considered in determining the lengths 48. The angles 31 will be selected in dependency on the dimensions of the largest workpiece which is to be measured by a given set of tracers. For example, for measuring of workpieces with a maximum diameter of up to 100 mm., each of the angles 31 may be about 30 degrees. In the range of up to 50 mm., each angle 31 may be about 20 degrees. Such selection of the angles 31 insures that the faces of the tracers invariably remain in continuous contact with workpieces whose maximum diameters are not outside of the prescribed range. Such selection further insures that the edges bounding the faces on the tracers 26, 26a cannot scratch the treated surface. When a set of tracers determines the removal of material from a relatively small workpiece (such as the workpiece 10'), only small portions of their faces will come into actual contact with the treated surface, i.e., the portions which are adjacent to the left-most edges of the tracers.

The purpose of the actuating lever 13 is to multiply the difference between consecutive minimal distances between the faces of the tracers 26, 26a when the workpiece 10 or 10' rotates. The lever 13 is mounted on the leg 7 and is rocked in response to movements of the leg 3 with reference to the leg 7. The blocking device including the sphere 20 insures that the lever 13 can be rocked in a single direction.

The ratio $A:B$ is the same as the ratio $a:b$ wherein A is the distance between the pivot axis of the leg 7 and the axis of the workpiece, B is the distance between the pivot axis of the leg 7 and the axis of the rocking screw 21 (i.e., the point where the motion of the leg 3 is transmitted to the actuating lever 13, and $a$ and $b$ are the effective lengths of the arms 14, 14b, respectively. For example, the ratio $A:a$ may be ten-to-one.

In order to properly calibrate the measuring unit of my improved apparatus, the operator inserts between the tracers 26, 26a a model whose dimensions correspond exactly to desired dimensions of a workpiece. By manipulating the knob 22, the operator can select the axial position of the screw 21 in such a way that the signal generating unit 32 will arrest the machine at the exact moment when the dimensions of the workpiece correspond to the dimensions of the model. While the workpiece rotates, the smallest distance between the tracers 26, 26a decreases gradually and, when such distance reaches or decreases to a predetermined minimum value, the unit 32 automatically generates a signal which brings the tool and/or the workpiece to a halt or otherwise prevents further removal of material from the workpiece. If desired, the unit 32 can also control the speed of the wheel 49 or 49' and/or the speed of the workpiece 10 or 10' in such a way that the speed decreases stepwise or gradually when the treatment of the workpiece is almost completed. A suitable connection between a signal generating unit and the motor means of a grinding machine is disclosed, for example, in German Patents No. 915,541 and 1,122,406, and in U.S. Patents Nos. 2,464,142, 2,625,773 and 2,745.221.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In an apparatus for controlling the operation of a machine wherein a tool removes material from a revolving workpiece whose surface to be treated has a minimum and a maximum diameter so that, while such surface remains in contact with the tool, the revolving workpiece reciprocates in a predetermined direction, a measuring unit comprising a pair of relatively movable carriers; and a tracer carried by each of said carriers, said tracers having faces which engage said surface in zones located diametrically opposite each other so that such tracers move toward and away from each other when the workpiece rotates whereby said zones travel back and forth in response to variations in radii of curvature of said surface of the workpiece, the length of said faces as seen in said predetermined direction at least approximating the length of one side of a right-angled triangle whose hypotenuse at least approximates the maximum diameter and whose third side at least approximates the minimum diameter of said surface.

2. A structure as set forth in claim 1, further comprising means for maintaining the faces of said tracers in uninterrupted contact with the surface of the revolving workpiece.

3. A structure as set forth in claim 2, wherein each of said carriers comprises ways and each of said tracers comprises a holder which is adjustable along the respective ways, said ways being mirror symmetrical with reference to a plane including the axis of the workpiece and located between said tracers.

4. A structure as set forth in claim 3, wherein said ways make an obtuse angle with each other.

5. A structure as set forth in claim 3, wherein said holders are detachable from the respective ways.

6. A structure as set forth in claim 3, wherein said tool is a wheel having an active peripheral surface and being rotatable about an axis which is parallel with the axis of the workpiece, the mutual inclination of said ways being such that a clearance remains between said active surface and said tracers while the faces of the tracers engage a surface whose maximum diameter at most equals the maximum diameter of the surface of the workpiece.

7. A structure as set forth in claim 1, further comprising a signal generating unit and an operative connection between said units for effecting the generation of a signal when, while moving toward each other and in response to continued removal of material from said surface, said faces are brought to positions at a predetermined minimum distance from each other.

8. A structure as set forth in claim 7, wherein said operative connection comprises an actuating member supported by one of said carriers and movable stepwise by the other carrier from a starting position to a preselected position in response to each movement of said tracers toward each other to operate said signal generating unit in said preselected position thereof.

9. A structure as set forth in claim 8, further comprising releasable blocking means for holding said actuating member against movement back toward said starting position.

10. A structure as set forth in claim 9, further comprising releasing means for disengaging said blocking means from said actuating member and biasing means for urging said actuating member to starting position.

11. A structure as set forth in claim 9, wherein said actuating member is a two-armed lever which is rockable with reference to said one carrier and said blocking means comprises two mutually inclined blocking surfaces respectively provided on one arm of said lever and on said one carrier, and a blocking element received between said blocking surfaces.

12. A structure as set forth in claim 11, wherein the mutual inclination of said blocking surfaces is such that said element is engaged thereby by self-locking action to prevent movement of said lever to starting position.

13. A structure as set forth in claim 12, further comprising resilient means for biasing said blocking element between said blocking surfaces.

14. A structure as set forth in claim 12, further comprising releasing means movable from an idle position to an operative position to thereby disengage said blocking element from said blocking surfaces and to thus permit movement of said actuating lever back to starting position.

15. A structure as set forth in claim 14, further comprising displacing means for moving said measuring unit into and from engagement with a workpiece and an operative connection between said releasing means and said displacing means for effecting disengagement of said blocking element in response to movement of said measuring unit away from a workpiece.

16. A structure as set forth in claim 15, wherein said displacing means comprises stop means for controlling the extent of movement of said releasing means between said idle and operative positions thereof.

References Cited
UNITED STATES PATENTS

| | | | |
|---|---|---|---|
| 1,976,459 | 10/1934 | Quichon | 82—14 |
| 2,464,142 | 3/1949 | Marshall | 51—2 |
| 2,603,043 | 7/1952 | Bontemps | 51—165 |
| 2,625,773 | 1/1953 | Cramer et al. | 51—165 |
| 2,666,993 | 1/1954 | Foster | 51—165 X |
| 2,745,221 | 5/1956 | Comstock | 51—165 |
| 2,826,012 | 3/1958 | Peras | 51—165 |
| 3,263,374 | 8/1966 | Stuckey et al. | 51—165 |

LESTER M. SWINGLE, *Primary Examiner.*